United States Patent [19]
Whitehead et al.

[11] Patent Number: 6,079,844
[45] Date of Patent: Jun. 27, 2000

[54] HIGH EFFICIENCY HIGH INTENSITY BACKLIGHTING OF GRAPHIC DISPLAYS

[75] Inventors: Lorne A. Whitehead; Stephane Frederick Jacob, both of Vancouver, Canada

[73] Assignee: The University of British Columbia, Vancouver, Canada

[21] Appl. No.: 09/205,705

[22] Filed: Dec. 4, 1998

Related U.S. Application Data

[63] Continuation-in-part of application No. 08/872,135, Jun. 10, 1997.

[51] Int. Cl.[7] .................................................. G09F 13/04
[52] U.S. Cl. ......................... 362/97; 362/310; 362/330; 362/29
[58] Field of Search ................. 362/29, 97, 223, 362/311, 812, 354, 31; 40/579, 580, 583, 564; 313/111, 117, 510

[56] References Cited

U.S. PATENT DOCUMENTS

| | | | |
|---|---|---|---|
| 4,835,661 | 5/1989 | Fogelberg | 362/97 |
| 4,984,144 | 1/1991 | Cobb, Jr. et al. | 362/449 |
| 4,989,125 | 1/1991 | Cobb, Jr. et al. | 362/346 |
| 5,221,987 | 6/1993 | Laughlin | 359/222 |
| 5,243,506 | 9/1993 | Whitehead | 362/307 |
| 5,373,428 | 12/1994 | Day | 362/223 |

FOREIGN PATENT DOCUMENTS

| | | |
|---|---|---|
| 500960 | 9/1992 | European Pat. Off. . |
| 717236 | 6/1996 | European Pat. Off. . |

*Primary Examiner*—Sandra O'Shea
*Assistant Examiner*—Hargobind S. Sawhney
*Attorney, Agent, or Firm*—Oyen Wiggs Green & Mutala

[57] ABSTRACT

Image display apparatus incorporating an enclosure having substantially opaque, substantially reflective interior surfaces. A light source emits light rays within the enclosure. An image-bearing surface is mounted in a front portion of the enclosure. The image-bearing surface bears a predefined image having transmissivity and reflectivity characteristics which vary as a function of position on the image-bearing surface, such that a substantial portion of the image is substantially non-transmissive and substantially reflective, and the remaining non-substantial portion of the image is substantially transmissive and substantially non-reflective. Accordingly, substantially all of the light rays which strike the reflective interior surfaces or strike the reflective portion of the image bearing surface are reflected within the enclosure, and substantially all of the light rays which strike the transmissive portion of the inward face are emitted through the image-bearing surface, thereby increasing luminance brightness of the image on an outward face of the image-bearing surface by repeated reflection of the reflected light rays within the enclosure until the reflected light rays strike the transmissive portion of the image-bearing surface.

38 Claims, 3 Drawing Sheets

HIGH EFFICIENCY HIGH INTENSITY BACKLIGHTING OF GRAPHIC DISPLAYS

REFERENCE TO RELATED APPLICATION

This is a continuation-in-part of U.S. Pat. application Ser. No. 08/872,135 filed Jun. 10, 1997.

TECHNICAL FIELD

A backlight for graphic images which yields a substantially higher ratio of luminous intensity to input power than conventional backlighted image displays.

BACKGROUND

Graphic images such as those seen in advertising signs are commonly illuminated by backlighting the image. It is desirable to backlight the image with the highest possible efficiency in order to improve the dynamic range of luminance values which can be perceived by persons viewing the backlighted image.

In conventional photography, only a relatively limited range of luminance values can be faithfully reproduced. Consequently, there are many visual situations which the eye can perceive well, but which cannot be captured photographically. Examples include most situations where sources of light are in the field of view, such as sunset scenes, scenes containing highly reflective ("shiny") surfaces, or night scenes containing neon signs, lamps, etc. The ability to display a larger dynamic range of luminance values would facilitate production of more visually effective graphic images, such as scenes of the aforementioned type which contain sources of light. This would in turn have value both aesthetically and in more effective advertising.

Ultra-high dynamic range images can be recorded in a single exposure by some conventional CCD array cameras, although not all CCD cameras can do so. However, two or three different exposures of the same scene can capture all the required information. An ultra-high dynamic range image can then be constructed in a fairly straight forward manner by overlapping multiple image layers obtained through more conventional photographic means. The problem is that, in order for an observer to perceive the full dynamic range of such an image, the image must be illuminated by an extremely bright backlight (at least 10 times brighter than conventional fluorescent light boxes, for example), which is impractical.

Conventional image backlighting techniques are inefficient in two important respects. First, a conventional backlight emits light with uniform brightness in all directions. Consequently, most of the emitted light is wasted, because the backlighted image is generally viewed only by persons having a restricted field of view which is typically within about 30 degrees of perpendicular horizontally, and within about 20 degrees of perpendicular vertically. If the emitted light could be concentrated within this range of angles, then a brightness increase of a factor of 4 could be attained. Second, most regions of most images are not very bright, meaning that very little incident light needs to be transmitted through such regions to persons viewing the image. In conventional image backlighting such non-transmitted light is absorbed and hence wasted. If such non-transmitted light could be effectively recycled, then typically another brightness increase factor of 5 could be attained. In combination, these two factors could enable a 20-fold increase in backlighting efficiency. In applications involving ultra high dynamic range images, such increased efficiency could yield a 10 times brighter peak luminance in a lighting structure requiring only 50% of the input power of a conventional prior art backlighted image.

The luminance intensity of a backlighted image is directly proportional to the flux of the light which illuminates the image, and inversely proportional to both the image area and the solid angle within which light is emitted from the image toward persons viewing the image. Therefore, in order to increase the luminance intensity of the backlighted image, one must either increase the flux; or, decrease either or both of the image area or the solid angle of light emission. Since flux is determined by the light source, and since the image area is fixed, prior art efforts to increase luminous intensity have been primarily directed to decreasing the solid angle of light emission. The present invention recognizes that it is possible to reduce the effective area of the image in a manner which yields a corresponding increase in luminous intensity, without reducing the physical size of the lighting structure or its image-bearing surface.

SUMMARY OF INVENTION

In a basic embodiment, the invention provides an image display apparatus incorporating an enclosure having substantially opaque, substantially reflective interior surfaces. A light source emits light rays within the enclosure. An image-bearing surface is mounted in a front portion of the enclosure. The image-bearing surface bears a predefined image having a transmissivity and reflectivity characteristic which varies as a function of position on the image-bearing surface, such that a substantial portion of the image is substantially non-transmissive and substantially reflective, and the remaining non-substantial portion of the image is substantially transmissive and substantially non-reflective. Accordingly, substantially all of the light rays which strike the reflective interior surfaces or strike the reflective portion of the image bearing surface are reflected within the enclosure, and substantially all of the light rays which strike the transmissive portion of the inward face are emitted through the image-bearing surface, thereby increasing luminance brightness of the image on an outward face of the image-bearing surface by repeated reflection of the reflected light rays within the enclosure until the reflected light rays strike the transmissive portion of the image-bearing surface.

The transmissivity characteristic restricts the emitted light rays to emission through the outward face of the image-bearing surface within a predefined range of directions. The reflectivity characteristic is preferably partially specular.

Optionally, an optical control structure surrounds a portion of the light source. The optical control structure controls emission of the light rays emitted by the light source to restrict the light rays which strike the transmissive portion of the image bearing surface within a predefined angular range which maximizes emission of such rays through the outward face of the image-bearing surface within a predefined range of directions. As another option, an optical film, which is preferably a prismatic film such as 2370 3M optical lighting film, can be positioned in front of the image-bearing surface to redirect light rays into a preferred viewing direction.

The aforementioned optical control structure may be a curved reflector, such as a parabolic concentrator, which confines light rays emitted by the light source within a selected angular range relative to the image-bearing surface. Alternatively, the curved reflector may be a compound parabolic concentrator with a prismatic cover on the open, outward end of the concentrator, such that the prismatic cover redirects light rays into a preferred direction relative to the image-bearing surface. The prismatic cover may be formed of 2370 3M optical lighting film having opposed prismatic and non-prismatic surfaces; the prismatic surface is positioned between the light source and the prismatic surface.

DESCRIPTION

Figure 1:
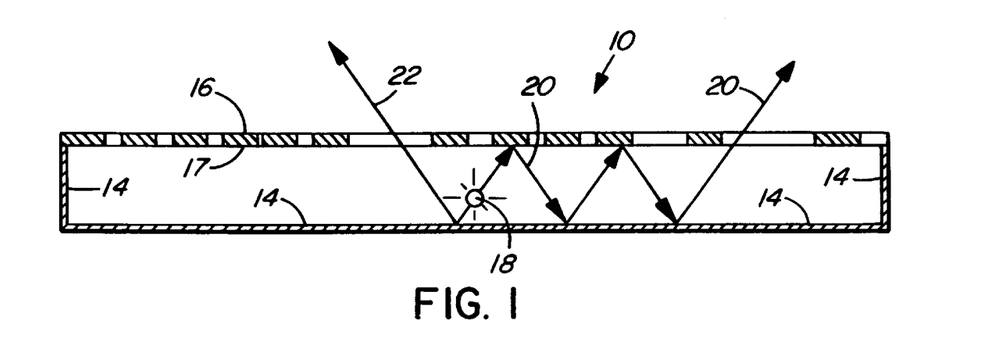
FIG. 1 is a top cross-sectional view of a first embodiment of an image display apparatus illuminated by an internal light source, with all interior portions of the apparatus except the image-bearing front surface being opaque and reflective, and with the image-bearing front surface having a spatially variable reflectance characteristic.

FIG. 1 depicts an image display apparatus 10 comprising an enclosure 12 having opaque, highly reflective interior surfaces 14. This can, for example, be achieved by applying reflective white paint to interior surfaces 14. Image-bearing front surface 16 is mounted in the front of enclosure 12 and constructed such that its interior face 17 has a pre-selected reflectance characteristic which varies as a function of position on interior face 17. That is, image-bearing front surface 16 is highly reflective in most regions (indicated in FIG. 1 by the closely spaced dashes forming surface 16), but it is also partially transmissive in such regions. Just enough light is transmitted through such regions to produce the relatively low brightness (i.e. low intensity illumination) required for adequate perception of most portions of the graphic image borne by surface 16. Conversely, front surface 16 has low reflectivity and high transmissivity in the comparatively few regions of surface 16 where relatively high image brightness (i.e. high intensity illumination) is desired (indicated in FIG. 1 by the more widely spaced dashes forming surface 16). This can be achieved in a variety of well known ways, including screen printing the desired image on interior face 17 so that on a small scale the image comprises many non-transmissive, highly reflective "dots" with the size of the transmissive, non-reflective spaces between the dots varying as a function of position on interior face 17. The dots are more closely spaced on less transmissive portions of interior face 17 where less light is to be allowed to escape through image-bearing surface 16, and more widely spaced on higher transmissive portions of interior face 17 where it is desired to allow more light to escape through image-bearing surface 16. At least one light source such as a fluorescent light bulb 18 positioned inside enclosure 12 emits light within enclosure 12.

On average, most light rays propagated inside enclosure 12 are reflected within enclosure 12, because most such rays, of which ray 20 is exemplary, contact the reflective, non-transmissive interior face 17 of image-bearing surface 16. Comparatively few rays, such as ray 22, contact the transmissive portions of image-bearing surface 16 so as to escape from enclosure 16. Because interior surfaces 14 are substantially reflective, relatively few of the reflected rays are absorbed by enclosure 12. Instead, most of the reflected rays undergo multiple reflections within enclosure 12, until they eventually encounter one of the transmissive portions of image-bearing surface 16 through which they can escape. This multiple reflection characteristic distributes the light evenly throughout enclosure 12, providing even distribution of illumination over the entire image-bearing surface 16, and conserving light rays until they can be emitted as aforesaid, thus ensuring high brightness illumination of the desired image. The conservation effect is so significant that it is possible to illuminate apparatus 10 with ordinary, low cost fluorescent light bulbs 18 instead of more expensive collimated light sources.

The reflective characteristics of interior surfaces 14 and image-bearing front surface 16 are preferably substantially specular, or substantially longitudinally specular. These characteristics can be understood by first considering the relationship between the direction of reflected light rays and the incident rays, in reference to the orientation of the reflective surface.

Consider a reflective surface have a normal direction described by a unit vector $\hat{n}$ that is perpendicular to and pointing away from the reflective surface. The unit vector $\hat{r}$ is used to describe the direction of a light ray, and it is helpful to describe this vector in terms of its components in the directions of a specific orthogonal set of unit vectors. The first of these three orthogonal unit vectors is $\hat{n}$, as already defined. The second unit vector, $\hat{a}$, is perpendicular to $\hat{n}$, (that is $\hat{n} \cdot \hat{a} = 0$). In some systems, such as those comprising linear micro-prismatic elements, $\hat{a}$ will be selected to be parallel to such elements, which may in turn be parallel to a preferred longitudinal axis of the structure. In other cases, $\hat{a}$ may have an arbitrary direction parallel to the reflective surface. Both cases are consistent with the following treatment. The third unit vector, $\hat{p}$, is perpendicular to the first two, such that $\hat{p} = \hat{n} \times \hat{a}$. With these definitions, any ray direction $\hat{r}$ can be defined as follows:

$$\hat{r} = n\hat{n} + a\hat{a} + p\hat{p} \quad (1)$$

where n, a, and p are defined as follows:

$$n = (\hat{n} \cdot \hat{r})$$
$$a = (\hat{a} \cdot \hat{r}) \quad (2)$$
$$p = (\hat{p} \cdot \hat{r})$$

Now, use the subscript i to refer to the incident ray, so that $\hat{r}_i$ is the direction of the incident ray, and $n_i$, $a_i$, $p_i$ are defined according to equations (1) and (2) above. Similarly, use the subscript r to denote the reflected ray direction. In general, there will be a distribution of reflected directions $\hat{r}_r$, (each having components $n_r$, $a_r$, $p_r$), and for each possible direction there will be a reflected intensity $I(\hat{r}_r)$, with this intensity function having the property that:

$$\oint fI(\hat{r}_r)d\Omega = 1 \quad (3)$$

The foregoing definitions make it possible to define the average values of the components $n_r$, $a_r$, $p_r$, designated $\bar{n}_r$, $\bar{a}_r$, $\bar{p}_r$, respectively, as follows:

$$\bar{n}_r = \oint fn_r I(\hat{r}_r)d\Omega$$
$$\bar{a}_r = \oint fa_r I(\hat{r}_r)d\Omega \quad (4)$$
$$\bar{p}_r = \oint fp_r I(\hat{r}_r)d\Omega$$

The foregoing definitions of $n_i$, $a_i$, $p_i$ and $\bar{n}_r$, $\bar{a}_r$, $\bar{p}_r$, in turn make it possible to describe the directional characteristics of reflection very easily. First, consider three extreme cases. The first case is that of a perfect Lambertian reflector, in which the angular distribution of the reflected light is symmetrical about the normal direction and is independent of the direction of the incident ray. In this case, it will be the case that $\bar{a}_r = \bar{p}_r = 0$, independent of $a_i$ and $p_i$.

The second case is that of a perfect specular reflector, for which, according to the well known law of reflection, $\bar{a}_r = a_i$, and $\bar{p}_r = p_i$. In this special case, it will also be true that $\bar{n}_r = -n_i$.

The third case is the case of a longitudinally specular reflective material such as 3M Scotch Optical Lighting Film™, in which reflection is caused by prisms running in the longitudinal direction â. In this case, the value of $\bar{p}_r$ will depend on many factors, but it will still always be true that $\bar{a}_r = a_i$. Thus the component of a light ray's motion in the direction of the prisms is preserved, such that propagation of light in the direction â can occur efficiently.

In the context of the present invention, one may attain varying degrees of utility by employing specular or longitudinally specular materials. Because such materials are more expensive than non-specular or non-longitudinally specular materials, in some cases an economic optimum may be achieved by using materials that lie somewhere between the extreme cases described above. As an aid to describing such intermediate cases, it is helpful to define the longitudinal specularity ratio, $k_a$, and the perpendicular specularity ratio, $k_p$, as follows:

$$k_a = \frac{\bar{a}_r}{a_i} \quad (5)$$

$$k_p = \frac{\bar{p}_r}{p_i}$$

From these definitions, it follows that $k_a = 1$ for longitudinally specular and specular material, and $k_a = k_p = 0$ for diffuse material. In general, the value of $k_a$ is the most useful parameter for describing the ease with which light can propagate from one region of a lighting structure to another region. Accordingly, the terms "substantially specular" or "substantially longitudinally specular" are used to refer to reflective materials for which $k_a$ is much closer to 1 than it is to 0, but which for practical reasons may differ from 1 by an observable and non-negligible amount.

In any cavity whose walls have reflective interior surfaces, light rays emitted into the cavity will reflect repeatedly. Such repetitive reflection is an important feature of the present invention, as it conserves light rays by allowing them to move from regions of the image-bearing surface through which it is not desirable to emit much light, to regions where this is desired, thus significantly enhancing efficiency. It is accordingly useful to develop a quantitative means of describing the internal reflection phenomenon to which light rays such as ray 20 are subject. At first this might seem difficult, as each light ray, upon striking an internal surface, may reflect in an infinitely large number of possible directions, and this reflection process repeats itself (with diminishing intensity) ad infinitum. This will be true regardless of the degree of reflectivity of the internal surfaces (providing they are non-zero, as is always the case in practice.) What is needed is a means of distinguishing substantially non-reflective cavities from substantially reflective cavities, in terms of the effective number of reflections.

For this purpose, it is helpful to consider a practical way of modelling such situations, which employs the so-called Monte Carlo method. In this method, light rays are treated conceptually as follows. Initially a light ray has an intensity $I_0$. When a light ray encounters a surface, it reflects in a randomly selected direction, with this random selection weighted probabilistically to represent the directional reflective characteristics of the surface, and leaves the surface with an intensity $I_1 = R_1 I_0$, where $R_1$ is the reflectivity of the surface at the point of incidence. As mentioned previously, there will be an infinite number of such reflections. The ray's intensity after n such reflections is $I_n$, where $I_n = R_n I_{n-1}$. It should be noted that such Monte Carlo modelling requires a large number of iterations to properly simulate the optical behaviour of a cavity. However, it is relatively easy to implement such modelling to a sufficient degree of accuracy y employing well known computer techniques. Thus, in the following discussion, it can be assumed that such modelling is carried out for a sufficiently large number of light rays that the average results are very well defined.

It is thus possible to define the average number of reflections to which all light rays in the cavity are subject, $\bar{N}$ as follows:

$$\bar{N} = \frac{\left(\sum_{n=1}^{\infty} I_n\right)}{I_o} \quad (6)$$

Even though this is an infinite sum, the result is finite and well defined. For example, in a situation where all the internal surfaces have the same reflectivity, R, it is straightforward to show that:

$$\bar{N} = 1/R \quad (7)$$

In general, the situation will be much more complex, of course, as R will vary from surface to surface and from place to place. Nevertheless, it will generally be the case that the higher the average reflectivity, the larger the typical number of reflections that will be experienced by light rays before being they are either absorbed or escape from the cavity, and hence the higher the light level and the higher the mobility of the light within the cavity. Since it is the number of reflections that causes these desirable effects, this desirable characteristic is best defined in terms of the value of $\bar{N}$.

Typically, to achieve the desirable properties of the present invention, it is preferable that $\bar{N} \geq 5$ and more preferable that $\bar{N} \geq 10$. In this regard, it should be noted that in principle it is possible to use materials with reflectivity values in excess of 0.98, for which corresponding values of $\bar{N}$ could exceed 50, and in some circumstances this could be highly desirable. Generally however the range $5 \leq \bar{N} \geq 10$ will be sufficient for the purposes described herein. One way of increasing the reflectivity of image bearing surface 16 is to decrease the spacing between the reflective "dots" screen printed on interior face 17.

Figure 2:
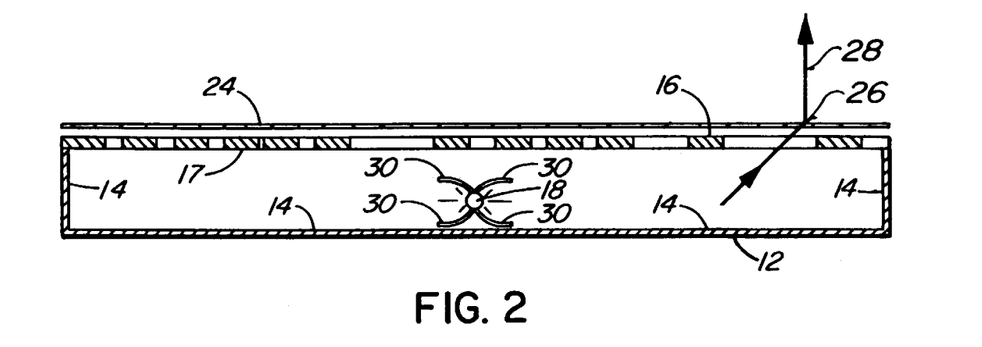
FIG. 2 is similar to FIG. 1, but includes a curved reflector for modifying the light output distribution of light emitted by the light source and an optical film for modifying the angular characteristic of light output by the apparatus.
Figure 3:
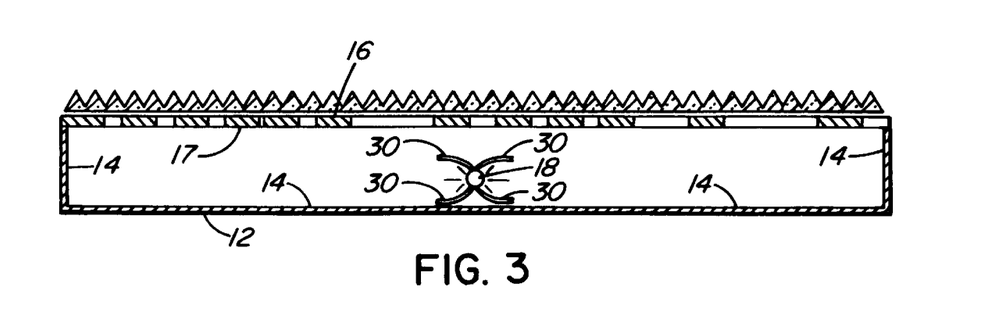
FIG. 3 is similar to FIG. 2, but substitutes for the optical film a prismatic film for redirecting emitted light rays into a preferred viewing direction.

The luminance intensity of the FIG. 1 apparatus can be improved by equipping fluorescent light bulb(s) 18 with one or more "optical control structures" in order to modify the light output distribution such that it is maximized in directions which are not perpendicular to interior surface 17 of image-bearing surface 16. To understand this, it is first necessary to explain the optical characteristic of optical film 24 which is preferably provided on the outward face of image-bearing surface 16, as seen in FIG. 2. Optical film 24, which may be "2370 3M™ Optical Lighting Film" available from Minnesota Mining and Manufacturing Company, St. Paul, Minn. has a plurality of outward facing prisms which are not right angle prisms. If light rays emitted by fluorescent bulb(s) 18 are constrained such that they meet the rearward surface of film 24 at an appropriate incidence angle (i.e. 49° if film 24 is 2370 3M™ Optical Lighting Film) the rays are refracted by film 24 as indicated at 26 in FIG. 2 such that, upon further refraction at the outward-facing prismatic surface of film 24 the rays are emitted in a direction substantially perpendicular to image-bearing surface 16, as indicated at 28 in FIG. 2.

Figure 6:
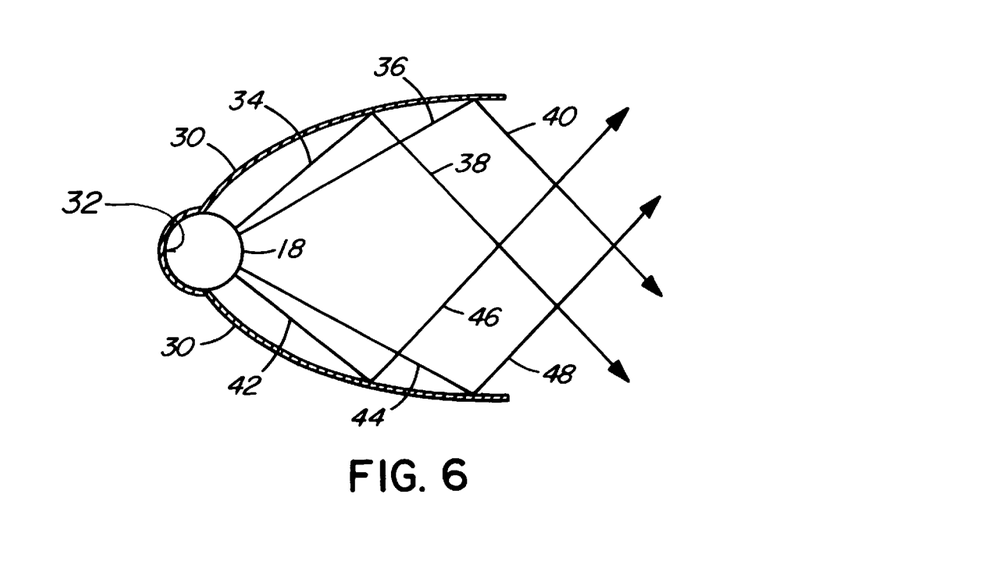
FIG. 6 depicts a compound parabolic concentrator for modifying the light output distribution of light emitted by a light source.

One suitable form of optical control structure is a curved reflector such as a pair of back-to-back, trough-like, compound parabolic concentrators 30, as shown in FIG. 2. Compound parabolic concentrator 30 are constructed to conform tightly to the outward surfaces of the respective fluorescent light bulb(s) 18, as best seen in FIG. 6. The light bulbs' rearward facing portions 32 are covered (i.e. painted) with a highly reflective material. Compound parabolic concentrator 30 are designed so that light is emitted from the concentrator at a maximum angle of 60°. A 60° angular emission range redirects a significant portion of the rays into the preferred 49° incidence angle for refraction of such 49° incidence rays by film 24 in a direction substantially perpendicular to image-bearing surface 16; with the remaining portion of the rays being emitted through image-bearing surface 16 in directions to either side of the aforementioned perpendicular direction, improving perception of the image over a range of viewing angles.

As shown in FIG. 6, any light rays 34, 36 which strike the upper portion of parabolic concentrator 30 as viewed in FIG. 6 are reflected downwardly and parallel to one another (i.e. reflected rays 38, 40). Similarly, any light rays 42, 44 which strike the lower portion of parabolic concentrator 30 as viewed in FIG. 6 are reflected (i.e. reflected rays 46, 48) upwardly and parallel to one another and perpendicular to reflected rays 38, 40.

Figure 7:
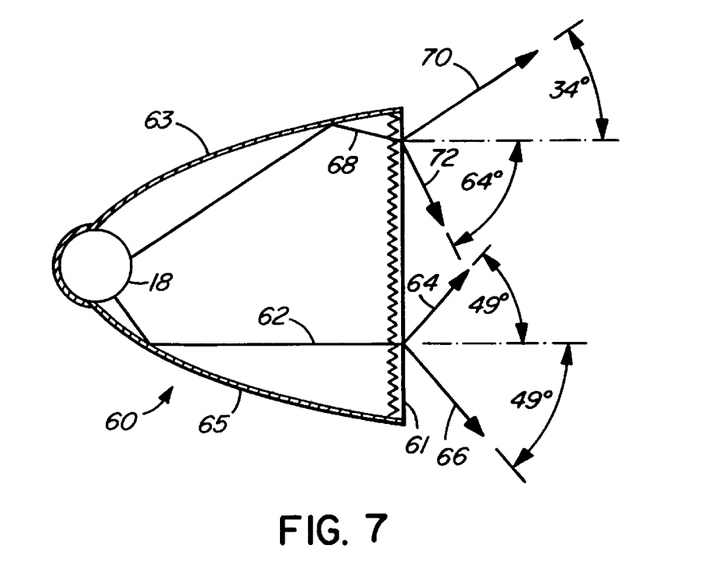
FIG. 7 is similar to FIG. 6 and shows a prismatic cover for redirecting emitted light rays into a preferred viewing direction.

FIG. 7 illustrates an alternative optical control structure utilizing another trough-like, compound parabolic concentrator 60, comprising horizontally symmetrical first and second parabolic sections 63, 65 which have different foci. Compound parabolic concentrator 60 is designed to have a maximum output angle of 15°. The open, outward end of parabolic concentrator 60 is covered with 2370 3M™ optical lighting film 61. The prismatic surface of film 61 faces light bulb 18, so that the light output through film 61 has the desired angular characteristic. In particular, rays reflected horizontally by parabolic concentrator 60 (i.e. ray 62) are in turn refracted by film 61 such that they emerge at an angle of about ±49° (i.e. rays 64, 66). Rays which are reflected at ±15° off the horizontal by compound parabolic concentrator 60 (i.e. ray 68) are refracted by film 61 such that they emerge at an angle of about 49°−15°=34° or −49°−15°=−64° (i.e. rays 70, 72). Rays reflected by compound parabolic concentrator 60 to reach film 61 within a ±15° incidence angular range are refracted by film 61 to emerge within corresponding angular ranges of −64° to −34° and 34° to 64°.

Figure 4:
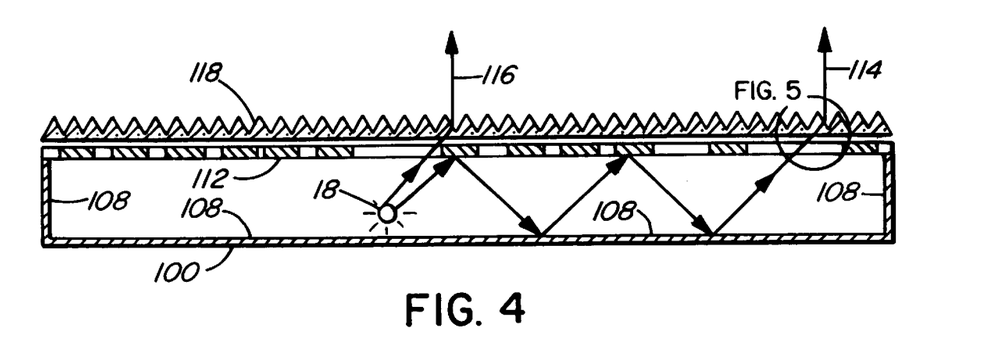
FIG. 4 is similar to FIG. 3 and shows light rays emitted in a direction perpendicular to the image bearing front surface.
Figure 5:
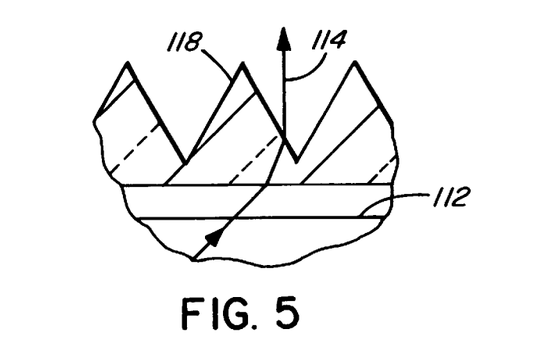
FIG. 5 depicts an enlarged segment of the prismatic film portion of the FIG. 4 apparatus.

FIG. 4 depicts an enclosure 100, into which at least one light source such as a fluorescent light bulb 18 positioned inside enclosure 100 emits light. Enclosure 100 has highly reflective inner surfaces 108 and a non-diffusely transmissive image-bearing front surface 112 having continuously variable reflectivity and transmissivity characteristics. The image-bearing front surface 112 is non-diffusely highly reflective in most regions (indicated in FIG. 4 by the closely spaced dashes forming surface 112), but it is also non-diffusely partially transmissive in such regions. Just enough light is transmitted through such regions to produce the relatively low brightness (i.e. low intensity illumination) required for adequate perception of most portions of the graphic image borne by surface 112. Conversely, front surface 112 has low reflectivity and high transmissivity in the comparatively few regions of surface 112 where relatively high image brightness (i.e. high intensity illumination) is desired (indicated in FIG. 4 by the more widely spaced dashes forming surface 112). Because surface 112 is highly reflective in most regions, most light incident upon the inward facing portion of surface 112 is reflected back into enclosure 100 and is thus propagated along enclosure 100, where it has an opportunity to encounter one of the few regions of surface 112 where high image brightness is desired, as in the case of light ray 114. Light ray 116 is typical of light rays emitted through image-bearing surface 112 after undergoing comparatively little propagation along enclosure 100.

Image-bearing front surface 112 is non-diffusely transmissive. The emitted light is re-directed into the perpendicular viewing direction by a sheet of prismatic film 118 mounted in front of surface 22, with the prismatic surface of film 118 facing outwardly, as shown. "2370 3M™ Optical Lighting Film" available from Minnesota Mining and Manufacturing Company, St. Paul, Minn. is suitable for use as prismatic film 118. More particularly, by employing one or more of the previously described optical control structures, one may cause a substantial portion of the light rays to strike image bearing front surface 112, at an angle of 49° above the horizontal, as viewed in FIG. 4. Any such rays which are emitted through image bearing front surface 112 are incident upon prismatic film 118 at the same 49° angle. Since image-bearing front surface 112 and the inner rear surface of enclosure 112 are parallel, light rays reflected by image bearing surface 112 are further reflected by the rear surface at the same angle of 49° above the horizontal. Accordingly, reflected rays which strike any of the low reflectivity, high transmissivity regions of surface 112 do so at 49°, which is the acceptance angle of 2370 3M™ Optical Lighting Film (in the orientation shown in FIG. 4) for which the emitted rays are re-directed into the perpendicular viewing direction.

A diffuser (not shown) can be mounted in front of prismatic film 118 to spread the light over the desired limited angular viewing range mentioned above. Because this range is still quite limited, higher brightness per unit flux is achieved compared to conventionally backlighted image display devices. Although the image perceived by an observer will be bright over a reasonable range of angles, this will not be so for all angles, particularly angles outside the typically restricted field of view mentioned above.

Various techniques can be used to produce image-bearing surface 112. For example, surface 112 may comprise an outer image-bearing sheet laminated to an inner sheet of high reflectivity material. The inner sheet can be provided with a plurality of apertures such that for any selected area on the inner sheet, that selected area is apertured in proportion to the desired intensity of illumination of the image adjacent that selected area (i.e. the light transmissivity characteristic of the inner sheet varies in proportion to the desired intensity of illumination of the image). Such variable aperturing of the inner sheet can be achieved by digitally processing the desired image to yield a surface brightness profile which can then be used in computer controlled aperturing of the inner sheet. Alternatively, surface 112 may be a half-tone imaged sheet of highly reflective material such as metallic film, with the density of the image (i.e. the number of dots per square inch used to form the image) varying in proportion to the desired intensity of illumination of the image.

Using digital image processing techniques it is also possible to simplify fabrication of the inner sheet of high reflectivity material in surface 112. For example, it may be more practical for this high reflectivity material to have just two transmissivity values: a uniform low transmissivity value in most regions of the image, and a high value in a few regions corresponding to high image brightness. Such an effect could be achieved by electronic cutting of a uniformly perforated film, for example. In such a case, it will generally be necessary to digitally alter the outer image-bearing sheet of surface 112 to appropriately compensate for the discontinuity of transmissivity of the inner high reflectivity sheet.

If image-bearing surface 112 has too little overall transmissivity then enclosure 100 will have undesirably low efficiency, because only a small fraction of the light will escape. If image-bearing surface 112 has too much overall transmissivity then surface 112 will be non-uniformly illuminated, because the light will escape primarily near light source 18, which is also undesirable. Thus it is necessary to select a transmissivity distribution which lies intermediate between these extremes and produces the desired image brightness distribution.

Figure 8:
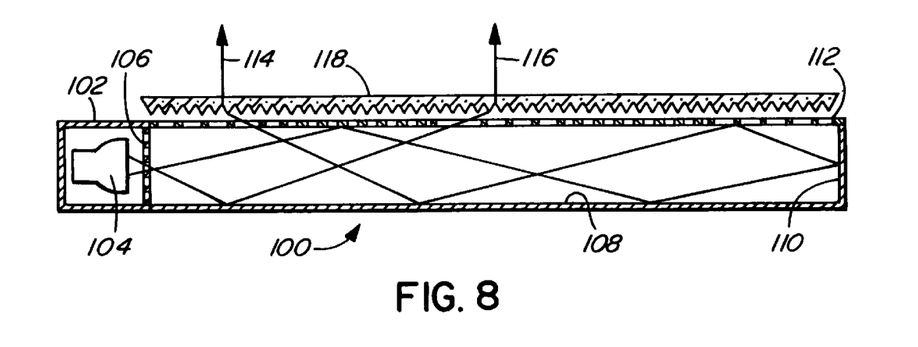
FIG. 8 is a top cross-sectional view of an externally illuminated image display apparatus incorporating a hollow light guide having a non-diffuse highly reflective inner rear surface and a non-diffusely partially transmissive, non-diffusely partially reflective image-bearing front surface.

FIG. 8 depicts an alternative embodiment which is similar to the FIG. 4 embodiment except that the FIG. 8 embodiment uses an external collimated light source, and the prismatic film is oriented inwardly in the FIG. 8 embodiment. Accordingly, many of the same reference numerals used in describing the FIG. 4 embodiment can also be used in describing the FIG. 8 embodiment.

More particularly, FIG. 8 depicts an enclosure 100, into which collimated light source 102 emits light. Light source 102 typically comprises a plurality of lamps 104 positioned adjacent an apertured, mirrored end 106 of enclosure 100 to emit light into enclosure 100 through end 106. This allows lamps 104 to be mounted outside enclosure 100 so that they can easily be replaced. Further, the arrangement has a high degree of lamp failure tolerance, in that a single lamp failure will be almost imperceptible to the observer. Such factors are particularly important to image and cost-conscious advertisers.

Enclosure 100 has a highly reflective inner rear surface 108, an end mirror 110 and a non-diffusely transmissive image-bearing front surface 112 having continuously variable reflectivity and transmissivity characteristics. The image-bearing front surface 112 is non-diffusely highly reflective in most regions (indicated in FIG. 8 by the closely spaced dashes forming surface 112), but it is also non-diffusely partially transmissive in such regions. Just enough light is transmitted through such regions to produce the relatively low brightness (i.e. low intensity illumination) required for adequate perception of most portions of the graphic image borne by surface 112. Conversely, front surface 112 has low reflectivity and high transmissivity in the comparatively few regions of surface 112 where relatively high image brightness (i.e. high intensity illumination) is desired (indicated in FIG. 8 by the more widely spaced dashes forming surface 112). Because surface 112 is highly reflective in most regions, most light incident upon the inward facing portion of surface 112 is reflected back into enclosure 100 and is thus propagated along enclosure 100, where it has an opportunity to encounter one of the few regions of surface 112 where high image brightness is desired, as in the case of light ray 114. Light ray 116 is typical of light rays emitted through image-bearing surface 112 after undergoing comparatively little propagation along enclosure 100.

Image-bearing front surface 112 is non-diffusely transmissive. Accordingly, light emitted through surface 112 retains a fairly high level of the collimation imparted by light source 102. The emitted light is re-directed into the perpendicular viewing direction by a sheet of prismatic film 118 mounted in front of surface 22, with the prismatic surface of film 118 facing inwardly, as shown. "2370 3M™ Optical Lighting Film" available from Minnesota Mining and Manufacturing Company, St. Paul, Minn. is suitable for use as prismatic film 118. More particularly, light source 102 is collimated to emit light rays at a maximum angle of about ±15° relative the horizontal, as viewed in FIG. 8. Since image-bearing front surface 112 and inner rear surface 108 are parallel, the light rays are reflected by rear surface 108 at the same angle of about ±15° relative the horizontal, as viewed in FIG. 8. Accordingly, reflected rays which strike any of the low reflectivity, high transmissivity regions of surface 112 do so at about ±15° relative the horizontal, which is the acceptance angle of 2370 3M™ Optical Lighting Film (in the orientation shown in FIG. 8) for which the emitted rays are re-directed into the perpendicular viewing direction.

A diffuser (not shown) can be mounted in front of prismatic film 118 to spread the light over the desired limited angular viewing range mentioned above. Because this range is still quite limited, higher brightness per unit flux is achieved compared to conventionally backlighted image display devices. Although the image perceived by an observer will be bright over a reasonable range of angles, this will not be so for all angles, particularly angles outside the typically restricted field of view mentioned above.

In practice, it is relatively easy to create complex image-bearing surfaces having the desired variable light transmissivity characteristic. Two or three trial and error iterations using optical prototyping and/or computer ray tracing techniques are normally sufficient.

The invention is well suited to use outdoors in high ambient brightness conditions. For example, in a highway sign, the image may consist of brightly illuminated text and a comparatively dark background. If such a sign is observed against a bright sky, the brightly illuminated text is more easily perceived than in a prior art sign. Alternatively, the image may consist of bright patterns to simulate the "look" of a prior art neon sign.

Persons skilled in the art will understand that lighting structures produced in accordance with the invention effectively reduce the area of the illuminated image, thereby increasing luminous intensity without reducing the physical size of the lighting structure or its image-bearing surface. In prior art backlighted signs, the effective area of the illuminated image is the same as the physical area of the image-bearing surface. Much of the light used to illuminate the image is wasted due to absorption by non-transmissive portions of the prior art image-bearing surface. By contrast, the effective area of an image illuminated in accordance with the invention is much less than the physical area of the image-bearing surface, because light which is not emitted through the relatively small transmissive portion of the image-bearing surface is efficiently reflected until it is able to escape through one of the transmissive portions of the image-bearing surface, as aforesaid.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. Image display apparatus, comprising:
   (a) an enclosure having substantially opaque, substantially reflective interior surfaces;
   (b) a light source positioned inside said enclosure for emitting light rays within said enclosure;
   (c) an image-bearing surface mounted in a front portion of said enclosure, said image-bearing surface bearing a predefined image having a transmissivity and reflectivity characteristic which varies as a function of position on said image-bearing surface such that a substantial portion of said image is substantially non-transmissive and substantially reflective, and the remaining non-substantial portion of said image is substantially transmissive and substantially non-reflective;
   whereby substantially all of said light rays which strike said reflective interior surfaces or strike said reflective portion of said image bearing surface are reflected within said enclosure, and substantially all of said light rays which strike said transmissive portion of said image bearing surface are emitted through said image-bearing surface, thereby increasing luminance brightness of said image on an outward face of said image-bearing surface by repeated reflection of said reflected light rays within said enclosure until said reflected light rays strike said transmissive portion of said image-bearing surface.

2. Image display apparatus as defined in claim 1, wherein said transmissivity characteristic restricts said emitted light rays to emission through said outward face of said image-bearing surface within a predefined range of directions.

3. Image display apparatus as defined in claim 2, wherein said reflectivity characteristic is partially specular.

4. Image display apparatus as defined in claim 3, further comprising an optical control structure surrounding a portion of said light source, said optical control structure for controlling emission of said light rays emitted by said light source to restrict said light rays which strike said transmissive portion of said image bearing surface within a predefined angular range which maximizes emission of said light rays which strike said transmissive portion of said image bearing surface through said outward face of said image-bearing surface within a predefined range of directions.

5. Image display apparatus as defined in claim 4, wherein said optical control structure is a curved reflector for confining light rays emitted by said light source within a selected angular range relative to said image-bearing surface.

6. Image display apparatus as defined in claim 5, wherein said curved reflector is a parabolic concentrator.

7. Image display apparatus as defined in claim 5, wherein said curved reflector further comprises:
   (a) a compound parabolic concentrator; and,
   (b) a prismatic cover on an open, outward end of said compound parabolic concentrator, said prismatic cover for redirecting light rays into a preferred direction relative to said image-bearing surface.

8. Image display apparatus as defined in claim 7, wherein:
   (a) said prismatic cover is 2370 3M optical lighting film having opposed prismatic and non-prismatic surfaces; and,
   (b) said prismatic surface is positioned between said light source and said prismatic surface.

9. Image display apparatus as defined in claim 4, further comprising a prismatic film mounted in front of said image-bearing surface, said prismatic film for redirecting light rays into a preferred viewing direction.

10. Image display apparatus as defined in claim 9, wherein:
    (a) said prismatic film is 2370 3M optical lighting film having opposed prismatic and non-prismatic surfaces; and,
    (b) said non-prismatic surface is positioned between said image bearing surface and said prismatic surface.

11. Image display apparatus as defined in claim 3, further comprising an optical film positioned in front of said image-bearing surface, said optical film for redirecting light rays into a preferred viewing direction.

12. Image display apparatus as defined in claim 11, wherein said optical film is a prismatic film.

13. Image display apparatus as defined in claim 12, wherein:
    (a) said prismatic film is 2370 3M optical lighting film having opposed prismatic and non-prismatic surfaces; and,
    (b) said non-prismatic surface is positioned between said image bearing surface and said prismatic surface.

14. Image display apparatus as defined in claim 3, further comprising:
    (a) an optical film positioned in front of said image-bearing surface, said optical film for redirecting light rays into a preferred viewing direction; and,
    (b) an optical control structure surrounding a portion of said light source, said optical control structure for maximizing emission of said light rays emitted by said light source within a predefined range of directions for which said optical film is able to redirect said light rays into said preferred viewing direction.

15. Image display apparatus as defined in claim 14, wherein said optical film is a prismatic film.

16. Image display apparatus as defined in claim 15, wherein:
    (a) said prismatic film is 2370 3M optical lighting film having opposed prismatic and non-prismatic surfaces; and,
    (b) said non-prismatic surface is positioned between said image bearing surface and said prismatic surface.

17. Image display apparatus as defined in claim 14, wherein said optical control structure is a curved reflector for confining light rays emitted by said light source within a selected angular range relative to said image-bearing surface.

18. Image display apparatus as defined in claim 17, wherein said curved reflector is a parabolic concentrator.

19. Image display apparatus as defined in claim 17, wherein said curved reflector further comprises:
    (a) a compound parabolic concentrator; and,
    (b) a prismatic cover on an open, outward end of said compound parabolic concentrator, said prismatic cover for redirecting light rays into a preferred direction relative to said image-bearing surface.

20. Image display apparatus as defined in claim 19, wherein:
    (a) said prismatic cover is 2370 3M optical lighting film having opposed prismatic and non-prismatic surfaces; and,
    (b) said prismatic surface is positioned between said light source and said prismatic surface.

21. Image display apparatus as defined in claim 1, wherein said reflectivity characteristic is partially specular.

22. Image display apparatus as defined in claim 21, further comprising an optical control structure surrounding a portion of said light source, said optical control structure for controlling emission of said light rays emitted by said light source to restrict said light rays which strike said transmissive portion of said image bearing surface within a predefined angular range which maximizes emission of said light rays which strike said transmissive portion of said image bearing surface through said outward face of said image-bearing surface within a predefined range of directions.

23. Image display apparatus as defined in claim 22, further comprising a prismatic film mounted in front of said image-bearing surface, said prismatic film for redirecting light rays into a preferred viewing direction.

24. Image display apparatus as defined in claim 23, wherein:
    (a) said prismatic film is 2370 3M optical lighting film having opposed prismatic and non-prismatic surfaces; and,
    (b) said non-prismatic surface is positioned between said image bearing surface and said prismatic surface.

25. Image display apparatus as defined in claim 22, wherein said optical control structure is a curved reflector for confining light rays emitted by said light source within a selected angular range relative to said image-bearing surface.

26. Image display apparatus as defined in claim 25, wherein said curved reflector is a parabolic concentrator.

27. Image display apparatus as defined in claim 25, wherein said curved reflector further comprises:
    (a) a compound parabolic concentrator; and,
    (b) a prismatic cover on an open, outward end of said compound parabolic concentrator, said prismatic cover for redirecting light rays into a preferred direction relative to said image-bearing surface.

28. Image display apparatus as defined in claim 27, wherein:
    (a) said prismatic cover is 2370 3M optical lighting film having opposed prismatic and non-prismatic surfaces; and,
    (b) said prismatic surface is positioned between said light source and said prismatic surface.

29. Image display apparatus as defined in claim 21, further comprising an optical film positioned in front of said image-bearing surface, said optical film for redirecting light rays into a preferred viewing direction.

30. Image display apparatus as defined in claim 29, wherein said optical film is a prismatic film.

31. Image display apparatus as defined in claim 30, wherein:
    (a) said prismatic film is 2370 3M optical lighting film having opposed prismatic and non-prismatic surfaces; and,
    (b) said non-prismatic surface is positioned between said image bearing surface and said prismatic surface.

32. Image display apparatus as defined in claim 21, further comprising:
    (a) an optical film positioned in front of said image-bearing surface, said optical film for redirecting light rays into a preferred viewing direction; and,
    (b) an optical control structure surrounding a portion of said light source, said optical control structure for maximizing emission of said light rays emitted by said light source within a predefined range of directions for which said optical film is able to redirect said light rays into said preferred viewing direction.

33. Image display apparatus as defined in claim 32, wherein said optical film is a prismatic film.

34. Image display apparatus as defined in claim 33, wherein:
    (a) said prismatic film is 2370 3M optical lighting film having opposed prismatic and non-prismatic surfaces; and,
    (b) said non-prismatic surface is positioned between said image bearing surface and said prismatic surface.

35. Image display apparatus as defined in claim 32, wherein said optical control structure is a curved reflector for confining light rays emitted by said light source within a selected angular range relative to said image-bearing surface.

36. Image display apparatus as defined in claim 35, wherein said curved reflector is a parabolic concentrator.

37. Image display apparatus as defined in claim 35, wherein said curved reflector further comprises:
    (a) a compound parabolic concentrator; and,
    (b) a prismatic cover on an open, outward end of said compound parabolic concentrator, said prismatic cover for redirecting light rays into a preferred direction relative to said image-bearing surface.

38. Image display apparatus as defined in claim 37, wherein:
    (a) said prismatic cover is 2370 3M optical lighting film having opposed prismatic and non-prismatic surfaces; and,
    (b) said prismatic surface is positioned between said light source and said prismatic surface.

* * * * *